(12) United States Patent
Aastuen et al.

(10) Patent No.: US 7,652,820 B2
(45) Date of Patent: *Jan. 26, 2010

(54) REFLECTIVE LCD PROJECTION SYSTEM USING WIDE-ANGLE CARTESIAN POLARIZING BEAM SPLITTER AND COLOR SEPARATION AND RECOMBINATION PRISMS

(75) Inventors: David J. W. Aastuen, Farmington, MN (US); Charles L. Bruzzone, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 338 days.

This patent is subject to a terminal disclaimer.

(21) Appl. No.: 11/315,721

(22) Filed: Dec. 22, 2005

(65) Prior Publication Data

US 2006/0098284 A1 May 11, 2006

Related U.S. Application Data

(63) Continuation of application No. 09/746,933, filed on Dec. 22, 2000, now Pat. No. 7,023,602.

(60) Provisional application No. 60/178,973, filed on Jan. 25, 2000.

(51) Int. Cl.
  *G02B 5/20* (2006.01)
  *G02B 27/28* (2006.01)
  *G03B 21/00* (2006.01)
  *G03B 21/14* (2006.01)

(52) U.S. Cl. .................. 359/495; 359/500; 359/502; 353/20; 353/31; 353/33; 353/81; 362/19

(58) Field of Classification Search ............ 359/487, 359/488, 495, 496, 500, 634, 638, 502; 353/20, 353/31, 33, 34, 37, 81; 362/19
See application file for complete search history.

(56) References Cited

U.S. PATENT DOCUMENTS 540,768 A 6/1895 Western
(Continued)

FOREIGN PATENT DOCUMENTS

AU 622812 3/1991
(Continued)

OTHER PUBLICATIONS

3M Innovation, Vikuiti Dual Brightness Enhancement Film (DBEF), 3M IPC, Copyright @ 2000, 2001.*

(Continued)

*Primary Examiner*—Ricky D Shafer

(57) ABSTRACT

An optical imaging system including an illumination system, a Cartesian PBS, and a prism assembly. The illumination system provides a beam of light, the illumination system having an f/# less than or equal to 2.5. The Cartesian polarizing beam splitter has a first tilt axis, oriented to receive the beam of light. A first polarized beam of light having one polarization direction is folded by the Cartesian polarizing beam splitter and a second polarized beam of light having a second polarization direction is transmitted by the Cartesian polarizing beam splitter. The Cartesian polarizing beam splitter nominally polarizes the beam of light with respect to the Cartesian beam splitter to yield the first polarized beam in the first polarization direction. The color separation and recombination prism is optically aligned to receive the first polarized beam. The prism has a second tilt axis, a plurality of color separating surfaces, and a plurality of exit surfaces. The second tilt axis may be oriented perpendicularly to the first tilt axis of the Cartesian polarizing beam splitter so that the polarized beam is nominally polarization rotated into the second polarization direction with respect to the color separating surfaces and a respective beam of colored light exits through each of the exit surfaces. Each imager is placed at one of the exit surface of the color separating and recombining prism to receive one of the respective beams of colored light, wherein each imager can separately modulate the polarization state of the beam of colored light.

16 Claims, 12 Drawing Sheets

U.S. PATENT DOCUMENTS

| | | |
|---|---|---|
| 2,604,817 A | 7/1952 | Schupp |
| 3,124,639 A | 3/1964 | Kahn |
| 3,438,691 A | 4/1969 | Makas |
| 3,508,809 A * | 4/1970 | Wilder et. al. ............... 359/495 |
| 3,610,729 A | 10/1971 | Rogers |
| 3,677,621 A * | 7/1972 | Smith ......................... 359/487 |
| 3,711,176 A | 1/1973 | Alfrey, Jr.et al. |
| 3,860,036 A | 1/1975 | Newman, Jr. |
| 4,446,305 A | 5/1984 | Rogers et al. |
| 4,520,189 A | 5/1985 | Rogers et al. |
| 4,521,588 A | 6/1985 | Rogers et al. |
| 4,525,413 A | 6/1985 | Rogers et al. |
| 4,720,426 A | 1/1988 | Englert et al. |
| 4,723,077 A | 2/1988 | Wu |
| 4,943,154 A | 7/1990 | Miyatake et al. |
| 4,943,155 A | 7/1990 | Cross, Jr. |
| 5,042,921 A | 8/1991 | Sato et al. |
| 5,122,905 A | 6/1992 | Wheatley et al. |
| 5,122,906 A | 6/1992 | Wheatley |
| 5,146,248 A | 9/1992 | Duwaer et al. |
| 5,188,760 A | 2/1993 | Hikmet et al. |
| 5,200,843 A | 4/1993 | Karasawa et al. |
| 5,210,548 A | 5/1993 | Grabowski |
| 5,211,878 A | 5/1993 | Reiffenrath et al. |
| 5,217,794 A | 6/1993 | Schrenk |
| 5,233,465 A | 8/1993 | Wheatley et al. |
| 5,235,443 A | 8/1993 | Barnik et al. |
| 5,269,995 A | 12/1993 | Ramanathan et al. |
| 5,278,680 A | 1/1994 | Karasawa et al. |
| 5,294,657 A | 3/1994 | Melendy et al. |
| 5,295,018 A | 3/1994 | Konuma et al. |
| 5,303,083 A | 4/1994 | Blanchard et al. |
| 5,316,703 A | 5/1994 | Schrenk |
| 5,319,478 A | 6/1994 | Funfschilling et al. |
| 5,321,683 A | 6/1994 | Olczak |
| 5,371,559 A | 12/1994 | San-Nohe et al. |
| 5,379,083 A | 1/1995 | Tomita |
| 5,389,324 A | 2/1995 | Lewis et al. |
| 5,448,404 A | 9/1995 | Schrenk et al. |
| 5,486,935 A | 1/1996 | Kalmanash |
| 5,486,949 A | 1/1996 | Schrenk et al. |
| 5,580,142 A | 12/1996 | Kurematsu et al. |
| 5,594,563 A | 1/1997 | Larson |
| 5,612,820 A | 3/1997 | Schrenk et al. |
| 5,621,486 A | 4/1997 | Doany et al. |
| 5,629,055 A | 5/1997 | Revol et al. |
| 5,686,979 A | 11/1997 | Weber et al. |
| 5,699,188 A | 12/1997 | Gilbert et al. |
| 5,721,603 A | 2/1998 | De Vaan et al. |
| 5,744,534 A | 4/1998 | Ishiharada et al. |
| 5,751,388 A | 5/1998 | Larson |
| 5,767,935 A | 6/1998 | Ueda et al. |
| 5,770,306 A | 6/1998 | Suzuki et al. |
| 5,783,120 A | 7/1998 | Ouderkirk et al. |
| 5,793,456 A | 8/1998 | Broer et al. |
| 5,808,794 A | 9/1998 | Weber et al. |
| 5,825,542 A | 10/1998 | Cobb, Jr. et al. |
| 5,825,543 A | 10/1998 | Ouderkirk et al. |
| 5,867,316 A | 2/1999 | Carlson et al. |
| 5,882,774 A | 3/1999 | Jonza et al. |
| 5,940,149 A | 8/1999 | Vanderwerf |
| 5,962,114 A | 10/1999 | Jonza et al. |
| 5,965,247 A | 10/1999 | Jonza et al. |
| 5,976,424 A | 11/1999 | Weber et al. |
| 5,991,077 A | 11/1999 | Carlson et al. |
| 5,999,316 A | 12/1999 | Allen et al. |
| 5,999,317 A | 12/1999 | Whitney |
| 6,012,820 A | 1/2000 | Weber et al. |
| 6,018,419 A | 1/2000 | Cobb, Jr. et al. |
| 6,024,455 A | 2/2000 | O'Neill et al. |
| 6,025,897 A | 2/2000 | Weber et al. |
| 6,031,665 A | 2/2000 | Carlson et al. |
| 6,045,894 A | 4/2000 | Jonza et al. |
| 6,049,419 A | 4/2000 | Wheatley et al. |
| 6,053,795 A | 4/2000 | Whitney et al. |
| 6,057,961 A | 5/2000 | Allen et al. |
| 6,072,629 A | 6/2000 | Fan et al. |
| 6,080,467 A | 6/2000 | Weber et al. |
| 6,082,876 A | 7/2000 | Hanson et al. |
| 6,088,067 A | 7/2000 | Willett et al. |
| 6,088,159 A | 7/2000 | Weber et al. |
| 6,088,163 A | 7/2000 | Gilbert et al. |
| 6,096,247 A | 8/2000 | Ulsh et al. |
| 6,096,375 A | 8/2000 | Ouderkirk et al. |
| 6,101,032 A | 8/2000 | Wortman et al. |
| 6,111,696 A | 8/2000 | Allen et al. |
| 6,111,697 A | 8/2000 | Merrill et al. |
| 6,113,811 A | 9/2000 | Kausch et al. |
| 6,117,530 A | 9/2000 | Jonza et al. |
| 6,120,026 A | 9/2000 | Whitney et al. |
| 6,124,971 A | 9/2000 | Ouderkirk et al. |
| 6,157,486 A | 12/2000 | Benson, Jr. et al. |
| 6,157,490 A | 12/2000 | Wheatley et al. |
| 6,160,663 A | 12/2000 | Merrill et al. |
| 6,179,948 B1 | 1/2001 | Merrill et al. |
| 6,207,260 B1 | 3/2001 | Wheatley et al. |
| 6,208,466 B1 | 3/2001 | Liu et al. |
| 6,256,146 B1 | 7/2001 | Merrill et al. |
| 6,288,172 B1 | 9/2001 | Goetz et al. |
| 6,296,927 B1 | 10/2001 | Jonza et al. |
| 6,297,906 B1 | 10/2001 | Allen et al. |
| 6,322,236 B1 | 11/2001 | Campbell et al. |
| 6,352,761 B1 | 3/2002 | Hebrink et al. |
| 6,368,699 B1 | 4/2002 | Gilbert et al. |
| 6,390,626 B2 * | 5/2002 | Knox ........................ 353/20 |
| 6,486,997 B1 | 11/2002 | Bruzzone et al. |
| 6,515,785 B1 | 2/2003 | Cobb, Jr. et al. |
| 6,531,230 B1 | 3/2003 | Weber et al. |
| 6,565,982 B1 | 5/2003 | Ouderkirk et al. |
| 6,569,515 B2 | 5/2003 | Hebrink et al. |
| 6,609,795 B2 | 8/2003 | Weber et al. |
| 6,613,421 B2 | 9/2003 | Jonza et al. |
| 6,635,337 B2 | 10/2003 | Jonza et al. |
| 6,667,095 B2 | 12/2003 | Wheatley et al. |
| 6,672,721 B2 * | 1/2004 | Aastuen et al. ............... 353/31 |
| 6,721,096 B2 | 4/2004 | Bruzzone et al. |
| 7,023,602 B2 | 4/2006 | Aastuen et al. |
| 7,083,847 B2 | 8/2006 | Jonza et al. |

FOREIGN PATENT DOCUMENTS

| | | |
|---|---|---|
| EP | 0 422 661 A2 | 4/1991 |
| EP | 0 488 544 A1 | 11/1991 |
| EP | 0 488 544 B1 | 6/1992 |
| EP | 0 492 636 A1 | 7/1992 |
| EP | 0 568 998 A2 | 10/1993 |
| EP | 0 606 940 A2 | 7/1994 |
| EP | 0 718 645 A2 | 6/1996 |
| EP | 0 837 351 A2 | 4/1998 |
| GB | 2177814 | 1/1987 |
| WO | 94/10589 | 5/1994 |
| WO | 95/27919 | 4/1995 |
| WO | 95/17303 | 6/1995 |
| WO | 95/17691 | 6/1995 |
| WO | 95/17692 | 6/1995 |
| WO | 95/17699 | 6/1995 |
| WO | 96/19347 | 6/1996 |
| WO | 97/01440 | 1/1997 |
| WO | 97/01774 | 1/1997 |
| WO | 97/32226 | 9/1997 |
| WO | 99/06203 | 2/1999 |
| WO | 99/36248 | 7/1999 |
| WO | 99/34246 | 8/1999 |

WO 99/59005 11/1999

OTHER PUBLICATIONS

Schrenk et al., "Nanolayer polymeric optical films", Tappi Journal, pp. 169-174, Jun. 1992.

Weber et al., "Giant Birefringent Optics in Multilayer Polymer Mirrors," Science, vol. 287, No. 5462, pp. 2451-2456, Mar. 31, 2000.
A.E. Rosenbluth, D.B. Dove, F.E. Doany, R.N. Singh, Contrast properties of reflective liquid crystal light valves in projection displays, IBM J. Res. Develop vol. 42 No. 34 May-Jul. 1998 XP-000885154.

* cited by examiner

REFLECTIVE LCD PROJECTION SYSTEM USING WIDE-ANGLE CARTESIAN POLARIZING BEAM SPLITTER AND COLOR SEPARATION AND RECOMBINATION PRISMS

CROSS REFERENCE TO RELATED APPLICATIONS

This application is a continuation of U.S. application Ser. No. 09/746,933 filed Dec. 22, 2000, now issued as U.S. Pat. No. 7,023,602, which claims benefit of U.S. Provisional Application No. 60/178,973, filed Jan. 25, 2000, both of which are incorporated by reference. Prior cases U.S. patent application Ser. No. 09/312,917, filed on May 17, 1999, issued as U.S. Pat. No. 6,486,997, U.S. patent application Ser. No. 08/958,329 filed Oct. 28, 1997, issued as U.S. Pat. No. 5,965,247 and Ser. No. 09/126,917, filed Jul. 31, 1998, abandoned, are also incorporated by reference.

BACKGROUND OF THE INVENTION

This invention relates to the use of 3M Cartesian polarizing beam splitter ("PBS") films to make electronic projection systems that use color separation and recombination prisms (e.g. Philips Prisms) with very efficient, low $f/\#$ optical beams while preserving high contrast. More specifically, the present invention relates to an optical imaging system including a reflective imager and a Cartesian wide-angle PBS having a fixed polarization axis and using the tilted reflective surfaces of a Philips prism.

Optical imaging systems may include a transmissive or a reflective imager or light valve. Traditional transmissive light valves allow certain portions of a light beam to pass through the light valve to form an image. By their very function, transmissive light valves are translucent; they allow light to pass through them only where required electrical conductors and circuits are not present. Reflective Liquid Crystal on Silicon ("LCOS") imagers, in turn, reflect selected portions of the input beam to form an image. Reflective light valves provide important advantages, as controlling circuitry may be placed below the reflective surface, so that these circuits do not block portions of the light beam as in the transmissive case. In addition, more advanced integrated circuit technology becomes available when the substrate materials are not limited by their opaqueness. New potentially inexpensive and compact liquid crystal display ("LCD") projector configurations may become possible by the use of reflective LC microdisplays. Reflective LCOS imagers in the past have been incorporated into inefficient, bulky and expensive optical systems.

For projection systems based on reflective LCD imagers, a folded light path wherein the illuminating beam and projected image share the same physical space between a PBS and the imager offers a desirably compact arrangement. A PBS is an optical component that splits incident light rays into a first polarization component and a second polarization component. Traditional PBS's selectively reflect or transmit light depending on whether the light is polarized parallel, or perpendicular to the plane of incidence of the light: that is, a plane defined by the incident light ray and a normal to the polarizing surface. The plane of incidence also is referred to as the reflection plane, defined by the reflected light ray and a normal to the reflecting surface.

Based on the operation of traditional polarizers, light has been described as having two polarization components, a p-component or direction and a s-component or direction. The p-component corresponds to light polarized parallel to the plane of incidence. The s-component corresponds to light polarized perpendicular to the plane of incidence. A so-called MacNeille PBS will substantially reflect s-polarized light incident on the PBS surface (placed along the diagonal plane connecting two opposing edges of a rectangular glass prism), and substantially transmit p-polarized light incident upon this surface. Traditional MacNeille PBS technology is known and is described in U.S. Pat. No. 2,403,731 and in H. A. Macleod, Thin Film Optical Filters, $2^{nd}$ Edition, McGraw-Hill Publishing Co., 1989, pp. 328-332.

To achieve the maximum possible efficiency in an optical imaging system, a low $f/\#$ system is desirable (see, F. E. Doany et al., Projection display throughput; Efficiency of optical transmission and light-source collection, IBM J. Res. Develop. V42, May/July 1998, pp. 387-398). The $f/\#$ measures the light gathering ability of an optical lens and is defined as:

$f/\# = f(\text{focal length}) \div D(\text{diameter or clear aperture of the lens})$ The $f/\#$ (or F) measures the size of the cone of light that may be used to illuminate an optical element. The lower the $f/\#$, the faster the lens and the larger the cone of light that may be used with that optical element. A larger cone of light generally translates to higher light throughput. Accordingly, a faster (lower $f/\#$) illumination system requires a PBS able to accept light rays having a wider range of incident angles.

The maximum incident angle $\theta_{max}$ (the outer rays of the cone of light) may be mathematically derived from the $f/\#$, F:

$\theta_{max} = \tan^{-1}((2F)^{-1})$

Traditional folded light path optical imaging systems have employed the previously described optical element known as a MacNeille PBS. MacNeille PBSs take advantage of the fact that an angle exists, called Brewster's angle, at which no p-polarized light is reflected from an interface between two media of differing index. Brewster's angle is given by:

$\theta_B = \tan^{-1}(n_1/n_0)$, where $n_0$ is the index of one medium, and $n_1$ is the index of the other. When the angle of incidence of an incident light ray reaches the Brewster angle, the reflected beam portion is polarized in the plane perpendicular to the plane of incidence. The transmitted beam portion becomes preferentially (but not completely) polarized in the plane parallel to the plane of incidence. In order to achieve efficient reflection of s-polarized light, a MacNellie PBS is constructed from multiple layers of thin films of materials meeting the Brewster angle condition for the desired angle. The film thicknesses are chosen such that the film layer pairs form a quarter wave stack.

There is an advantage to this construction in that the Brewster angle condition is not dependent on wavelength (except for dispersion in the materials). However, MacNeille PBSs have difficulty achieving wide-angle performance due to the fact that the Brewster angle condition for a pair of materials is strictly met at only one angle of incidence. As the angle of incidence deviates from this angle, a spectrally non-uniform leak develops. This leak becomes especially severe as the angle of incidence on the film stack becomes more normal than the Brewster's angle. As will be explained below, there are also contrast disadvantages for a folded light pat projector associated with the use of p- and s-polarization, referenced to the plane of reflection for each my.

Typically, MacNellie PBSs are contained in glass cubes, wherein a PBS thin-film stack is applied along a diagonal plane of the cube. By suitably selecting the index of the glass in the cube, the PBS may be constructed so that light incident normal to the face of the cube is incident at the Brewster angle of the PBS.

MacNeille-type PBSs reportedly have been developed capable of discrimination between s- and p-polarized light at f/#'s as low as f/2.5, while providing extinction levels in excess of 100:1 between incident beams of pure s- or pure p-polarization. Unfortunately, as explained below, when MacNeille-type PBS's are used in a folded light pat with reflective imagers, the contrast is degraded due to depolarization of rays of light having a reflection plane rotated relative to die reflection plane of the central ray. As used below, the term "depolarization" is meant to describe the deviation of the polarization state of a light ray from that of the central light ray. As light in a projection system generally is projected as a cone, most of the rays of light are not perfectly parallel to the central light ray. The depolarization increases as the f/# decreases, and is magnified in subsequent reflections from color selective films. This "depolarization cascade" has been calculated by some optical imaging system designers to effectively limit the f/# of MacNellie PBS based projectors to about 3.3, thereby limiting the light throughput efficiency of these systems. See, A. E. Rosenbluth et al., Contrast properties of reflective liquid crystal light valves in projection displays, IBM I. Res. Develop. V42, May/July 1998, pp. 359-386, (hereinafter "Rosenbluth Contrast Properties") relevant portions of which are hereby incorporated by reference.

Recently, Minnesota Mining and Manufacturing has developed a novel type of birefringent polymeric multi-layer polarizing film ("3M Advanced Polarizing Film" or "APF"). Co-assigned and (co-pending) parent application U.S. Ser. No. 09/312,917, issued as U.S. Pat. No. 6,486,997, mentions the use of such a film as a PBS. European Patent Application EP 0 837 351 A2 attempts to utilize another 3M Dual Brightness Enhancing Film ("DBEF"), an early 3M multi-layer film material, in a projection display apparatus having a "wide-angle" reflecting polarizer. Such reference refers to p- and s-differentiation and uses the 3M material as a common reflective polarizer. Moreover, while "wide-angle" performance is a widely recognized design goal, references to "wide-angle" are meaningless absent contrast limits and spectral leak reduction and teachings on how to achieve such a goal. The 3M product DBEF is a reflective polarizer with typical block direction leakages of 4 to 6 percent at normal incidence. At higher angles the leakage is somewhat reduced, but at 45 degrees the extinction is typically still a few percent. Contrast ratios when using DBEF typically will be limited to maximum values at or below 99:1 for white light. However, DBEF suffers from spectral leaks that reduce the contrast of certain color bands to as low as 25:1, depending on the nature of the illumination source and the exact DBEF sample. To obtain superior performance it is desirable that good screen uniformity and the absence of spectral leaks in the dark state accompany good average contrast in all relevant color bands.

There has been previous work with non-telecentric configuration, reported by Paul M. Alt in the *Conference Record of the 1997 International Display Research Conference* (p. M 19-28) and in the *IBM Journal of Research and Development* (Vol. 42, pp. 315-320, 1998). These systems, however, used conventional MacNeille PBS cubes rather than a Cartesian PBS, and achieved a contrast ratio of only 40:1 at $f/5$. The PBS and the color prism were used in an s-orientation.

The need remains for an optical imaging system that includes truly wide angle, fast optical components and that may allow viewing or display of high-contrast images. Furthermore, it is desirable to enable optical designs that minimize the size of individual components, such as the color separation prism.

A color separation prism receives the polarized beam of light and splits the beam, generally into three-color components. Color prisms and imagers naturally have an orientation, including a long axis and a short axis. Optical designers are presently constrained to one of two options. The first is to place the imager on the color prism such that the long axis of the imager is parallel to the long axis of the color prism exit aperture (to the imagers). This allows the use of smallest possible color prism, but under this condition, if the tilt axes of the PBS and the color prism are kept parallel to each other, then the designer is constrained to build the projector in a tower configuration. Such a configuration places the longest dimension of the projector in a vertical orientation, which may be unsuitable for a variety of applications. The second option is to place the long axis of the imager along the short direction of the color prism exit aperture (to the imagers). This allows the use of more desirable low-profile projector configurations, wherein the longest dimension of the projector is horizontal. However, this requires that the color prism be made larger and therefore that the projection lens have a longer back focal length. Consequently, this configuration will require larger, heavier, and more expensive projection lens and color prism components.

SUMMARY OF THE INVENTION

The present invention describes an optical imaging system including and advantageously employing a wide-angle "Cartesian" polarizer beam splitter ("PBS") and a Philips prism for separating and recombining separate color bands. The optical imaging system of the present invention is capable for use with "fast" (low $f/\#$) optical beams while providing a high contrast ratio. The term optical imaging system is meant to include front and rear projection systems, projection displays, head-mounted displays, virtual viewers, heads-up displays, optical computing, optical correlation and other similar optical viewing and display systems. A Cartesian PBS is defined as a PBS in which the polarization of separate beams is referenced to invariant, generally orthogonal principal axes of the PBS. In contrast with a MacNeille PBS, in a Cartesian PBS the polarization of the separate beams is substantially independent of the angle of incidence of the beams. The use of a Cartesian PBS film also allows the development of systems using curved PBS that provide higher light output and/or replace or augment other optical components.

A wide-angle PBS is defined as a PBS capable of receiving a cone of light rays with an angle of incidence up to 11° (in air) or more, while maintaining acceptable system contrast. By recognizing and advantageously applying properties of wide-angle Cartesian polarizers, the present invention discloses a high-efficiency optical imaging system capable of functioning at $f/\#$'s equal to or below $f/2.5$ while maintaining a contrast ratio of at least 100 to 1, or, more preferably, 150 to 1 in a projection system configuration.

An embodiment of an optical imaging system in accordance with the present invention includes a wide-angle Cartesian PBS, light valve illumination optics having an $f/\# \leq 2.5$, a color separation and recombination prism and at least two reflective light valves. The Cartesian PBS has a structural orientation defining fixed polarization axes. A reflective Cartesian PBS substantially reflects those components of a beam of light that are polarized along one such fixed axis, called the Material Axis. Those components of a beam of light with polarization not along the Material Axis are substantially transmitted. The PBS therefore splits incident light into a first and a second substantially polarized beam having polarization states referenced to the fixed polarization axes and the PBS directs the first polarized beam onto the reflective light valve. In an exemplary embodiment, the Cartesian PBS includes 3M's APF. In other exemplary embodiments, the PBS may include a wire grid polarizer, such as those described in Schnabel et al., "*Study on Polarizing Visible Light by Subwavelength-Period Metal-Stripe Gratings*", Optical Engineering 38(2), pp. 220-226, February 1999, relevant portions of which are hereby included by reference. Other suitable Cartesian polarizers also may be employed.

The light valve illumination optics have an $f/\#$ of at most 2.5, a minimum cone angle of about 11 degrees (in air) and the system has a contrast ratio exceeding 100 to 1 using an ideal imager. In preferred embodiments, the contrast ratio exceeds 150 to 1 and the illumination optics have an $f/\#$ equal or less than 2.2. The illumination optics are those optics that condition (e.g., pre-polarize, shape, homogenize and filter) the light beam. The $f/\#$ is associated with the beam of light incident on the imager.

The light valves or imagers may be a polarization modulating light valve, including smectic or nematic liquid crystal light valves. The optical imaging system may further comprise a pre-polarizer that polarizes input light into pre-polarized light, the pre-polarized light comprising the incident light on the PBS. The optical imaging system also includes a color separation and recombination prism assembly or mirrors and a plurality of reflective light valves (i.e., imagers). The prism assembly has a second tilt axis, a plurality of color separating surfaces, and a plurality of exit surfaces. The prism receives the polarized light from the PBS, separates the polarized light into a plurality of colors and directs polarized color beams to each light valve. The optical imaging system may include a suitable light source that supplies the incident light.

In alternative embodiments, the reflective light valve may reflect at least a portion of the first polarized beam back to the original PBS or to a second PBS.

As stated above, a color prism exit aperture (to the imagers) has an orientation, including a long axis and a short axis. If an optical designer places the imager on the color prism such that the long axis of the imager is parallel to the long axis of the color prism exit aperture, then the designer will achieve the smallest and lightest projector configuration. However, under this condition, because traditionally the tilt axes of the PBS and the color prism are constrained to be parallel to each other, then the designer is constrained to build a tower configuration. Alternatively, a larger color prism can be made to accommodate the imager oriented perpendicularly to the configuration discussed above, but such an orientation has the disadvantages of increasing the size, weight, and cost of the color prism. It also results in a longer back focal length for the projection lens, adding to the complexity, size and expense of this lens. The use of a Cartesian PBS was found to enable the rotation of the color prism such that the tilt axis for the color separating coatings are orthogonal to the tilt axis of the PBS. This allows the user the option to build either a tower of a flat configuration without weight, size, or cost penalty.

It is highly desirable that the prism be capable of orientation with the tilt axes of its color separation surfaces either parallel to that of the PBS's polarization separation surface or perpendicular to it, as the designer desires. This allows the system designer to have maximum flexibility with regard to industrial design, cooling, imager placement and other practical projection system considerations. The combination of the Cartesian PBS and the color prisms can, at low $f/\#$, enable the color prism and PBS to have crossed tilt axes and obtain good contrast. This allows a flat, low profile orientation with minimized CP size, which is particularly desirable for portable front projection systems. The present work details specific types of color prism to be used, as well as prism orientation to achieve desirable results.

DETAILED DESCRIPTION OF THE INVENTION

Figure 1A:
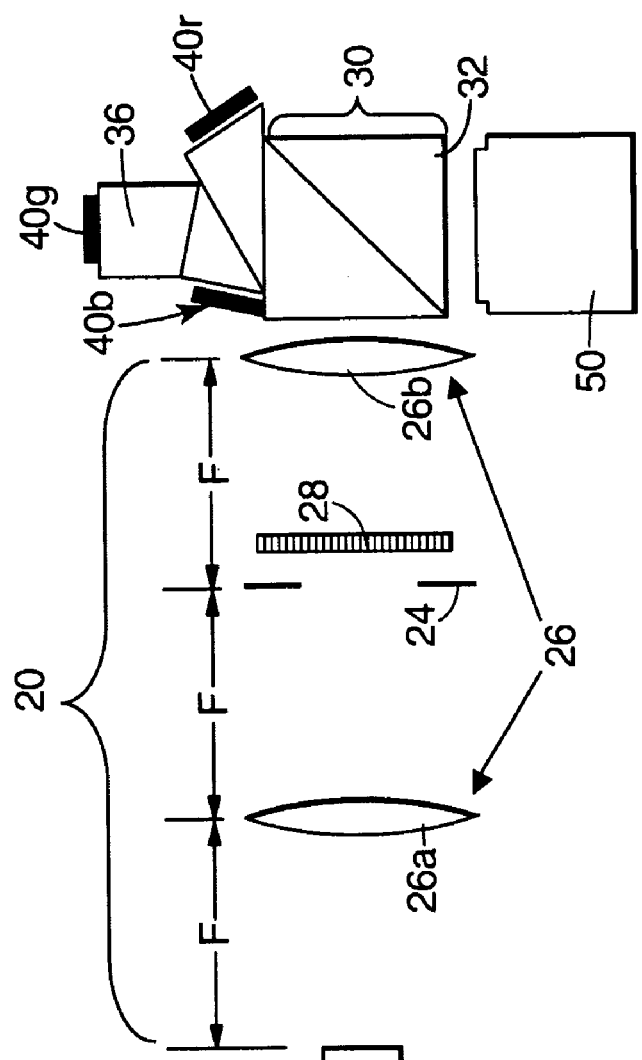
FIGS. 1*a* and 1*b* are schematic plan views of two embodiments of projection systems in accordance with the present invention.
Figure 1B:
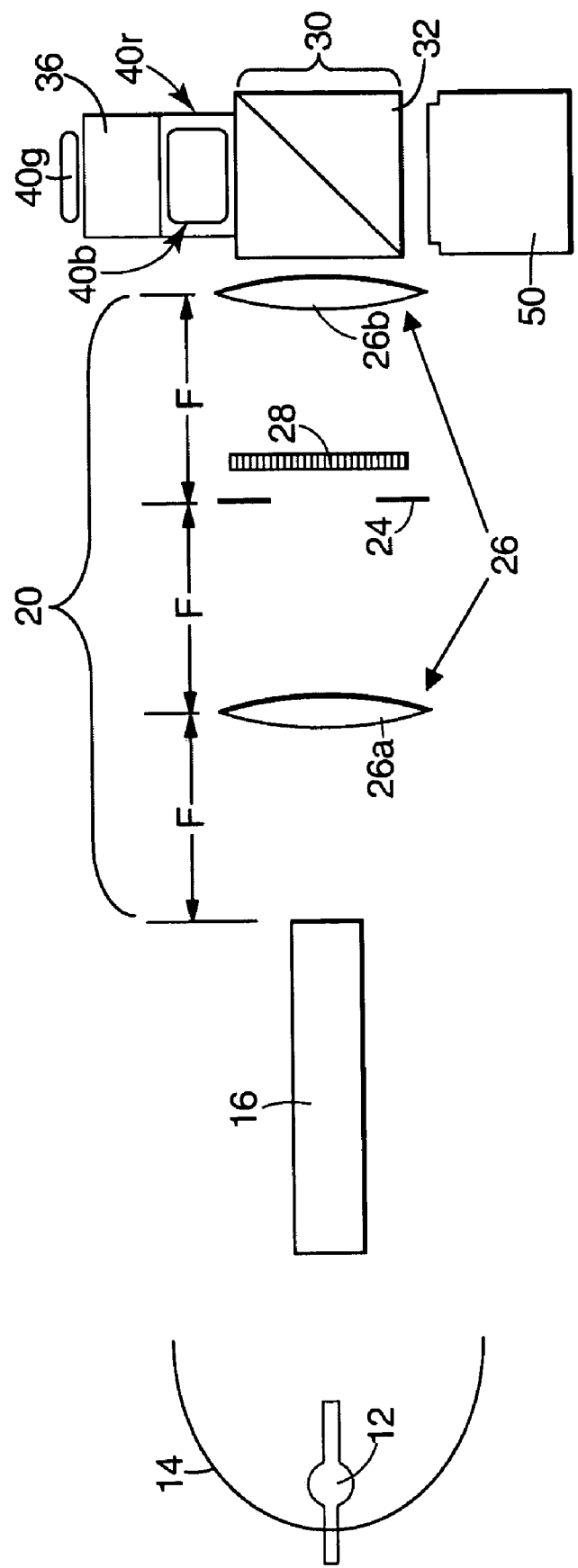

FIGS. 1*a* and 1*b* are schematic plan views of projection systems in accordance with the present invention. FIG. 1*a* illustrates an f/2 test system according to the present invention having a PBS and color prism assembly oriented with parallel tilt axes. FIG. 1*b* illustrates an f/2 test system according to the present invention having a PBS and color prism assembly oriented with perpendicular or orthogonal tilt axes. Referring to FIGS. 1*a*, 1*b*, 2*g* and 2*b*, the following reference numerals are used in the descriptions:

| Part list: | |
| --- | --- |
| 12 | Arc lamp |
| 14 | Elliptical reflector |
| 16 | Tunnel integrator |
| 20 | Telecentric illumination system |
| 24 | Telecentric stop |
| 26a, 26b | Telecentric lenses |
| 28 | Pre-polarizer |
| 30 | Polarization beam splitter (PBS) |
| 32 | Cartesian PBS film |
| 36 | Philips color prism assembly |
| 38 | Color prism exit aperture |
| 38v | "Vertical" dimension of CP |
| 38h | "Horizontal" dimension of CP |
| 40b | Blue imager |
| 40g | Green imager |
| 40r | Red imager |
| 50 | Projection lens |
| 56 | PBS tilt axis |
| 58 | CP tilt axes |
| 60 | Illumination optic axis |
| 62 | Optic axis through C |

The tilt axes of the PBS and color separation prisms are shown as parallel in this embodiment. The long dimension of the color prism exit aperture is out of the page.

The present invention analyzes and recognizes a "depolarization cascade" problem that limits the $f/\#$ of the illumination optics of traditional optical imaging systems using a PBS based on discrimination between p- and s-polarization states. Most reflective LCD imagers are polarization rotating; that is, polarized light is either transmitted with its polarization state substantially unmodified for the darkest state, or with a degree of polarization rotation imparted to provide a desired gray scale. A 90° rotation provides the brightest state in these PBS-based systems. Accordingly, a polarized beam of light generally is used as the input beam for reflective LCD imagers. Use of a PBS offers attractive design alternatives for both polarizing the input beam and folding the light path.

The exemplary system illustrated by FIGS. 1a and 1b differ in some ways from a commercial projector (e.g., there is no provision for converting nominally p-polarized light from the lamp into the desired s-polarization state to improve efficiency), but it does provide a flexible test system which allows easy modification of the $f/\#$ of the illuminating beam of light. In the system of FIGS. 1a and 1b, light is emitted from a metal halide or high pressure mercury arc lamp, 12, and collected by elliptical reflector, 14. The converging beam of light from the lamp and reflector is inserted into a glass tunnel beam integrator, 16, which reflects the beam multiple times inside itself by total internal reflection. This results in a more uniform beam intensity being emitted at the down-stream end of the tunnel integrator than was inserted at the upstream end. The tunnel integrator should preferably have the same cross-sectional dimensions as the optically active pixel area of the imagers (40b, 40g, and 40r) to be illuminated.

After being emitted from the tunnel integrator, the light is collected by the first telecentric lens 26a of the telecentric illumination system, 20. This lens is located one focal distance from the emitting end of the tunnel integrator, 16, and transmits the light through the telecentric stop, 24, and onto the second telecentric lens, 26b. Between the telecentric stop, 24, and the second telecentric lens, 26b, we have placed a pre-polarizer 28 to polarize the light perpendicularly to the plane of FIGS. 1a and 1b. This is referred to as "vertically" or "nominally s-" polarized. The pre-polarizer, 28, could be placed at a number of places in the system, but the light intensity is lower near the telecentric stop, 24, than at other convenient places in the system. Placement of the pre-polarizer, 28, either directly before or after this stop therefore ensures maximum polarizer lifetime.

The resulting vertically polarized, telecentric beam then passes into the Cartesian PBS, 30, in which the Cartesian PBS film 32 is oriented to substantially reflect vertically polarized light. It is understood that the term "film" is not limiting, and could refer to, for example, the array of elements in a wire grid polarizer, or the 3M APF multilayer optical film polarizer. The light therefore passes into the Color Prism Assembly, 36, where it is separated into distinct red, green, and blue beams that illuminate the red, green and blue imagers (40r, 40g, and 40b) respectively. For purposes of clarity, the Color Prism Assembly, 36, is shown in the conventional orientation with the tilt axes of the red and blue reflective coatings parallel to the tilt axis of the Cartesian PBS film, 32. While this orientation is necessary for the prior art, using MacNeill PBS's, it will be shown below that the employment of a Cartesian PBS film, 32, allows the rotation of the Color Prism Assembly, 36, by 90 degrees about the principle axis of the beam, so that the red and blue imagers in the figure would be oriented vertically with respect to one another in the figure, and the nominally s-polarized light from the PBS, 30, would be p-polarized with respect to the color selective surfaces of the Color Prism Assembly, 36.

Figure 2A:
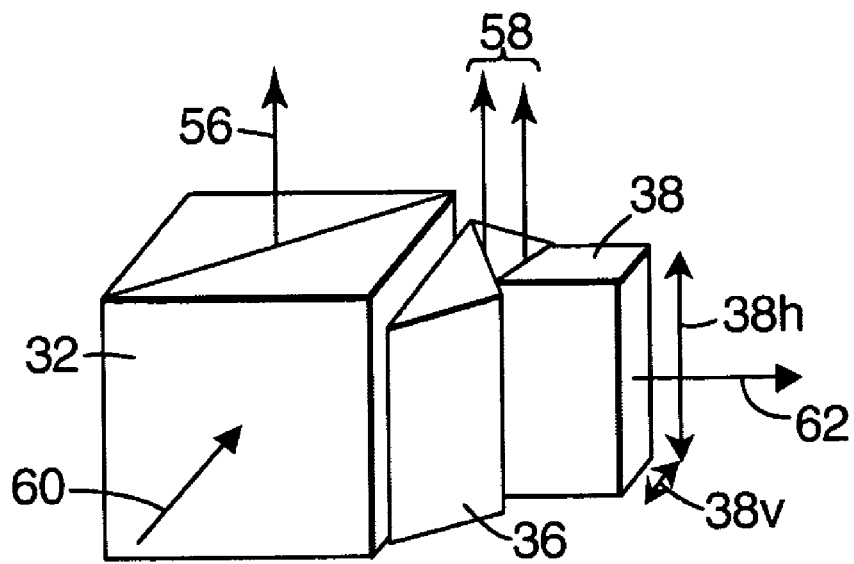
FIGS. 2*a* and 2*b* are side perspective views of a first and a second PBS and color prism assembly oriented with parallel and perpendicular tilt axes in accordance with the present invention.
Figure 2B:
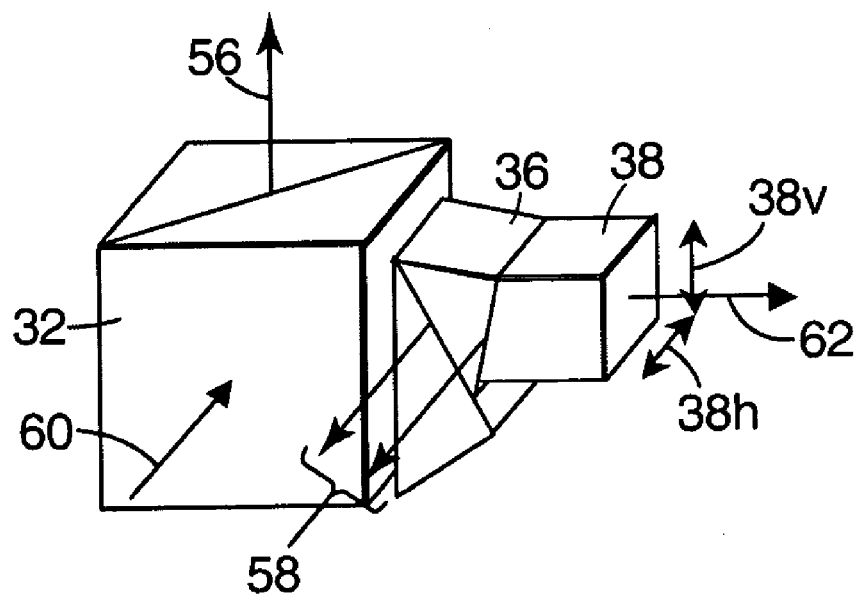

This is further illustrated in FIGS. 2a and 2b. FIG. 2a shows an arrangement in which the tilt axes, 58, of the Color Prism Assembly, 36, are parallel to the tilt axis, 56, of the PBS, 30. FIG. 2b shows the arrangement made possible by a Cartesian PBS, 32, in which the tilt axes, 58, of the Color Prism Assembly, 36, are perpendicular to the tilt axis, 56, of the PBS, 30.

It should also be noted that the Color Prism Assembly employed in FIGS. 1a and 1b may be configured so that the green light beam is reflected along with either the red or blue beam, rather than having the green light pass undeflected onto the green imager. In that case, either the red or blue beam would pass undeflected onto its intended imager.

Each imager, 40r, 40g, and 40b, is divided into many separate and independent picture elements (pixels), each of which can be individually addressed to rotate the polarization state of the incident light as it is reflected off each pixel. If a pixel element for a particular color channel is intended to be dark, then no polarization rotation occurs at that pixel on the appropriate imager, and the light is reflected back out through the Color Prism Assembly, 36, and into the PBS, 30. The light reaching the Cartesian PBS Film, 32, from this color pixel element is then still vertically polarized, and therefore reflected by the Cartesian PBS Film, 32, back through the telecentric system and into the lamp. Substantially, none of this light will propagate into the Projection Lens assembly, 50, and therefore substantially none will be projected onto the screen (not shown). If a pixel element for a particular color channel is intended to be bright, then polarization rotation occurs at that pixel on the appropriate imager, and the light is reflected back out through the Color Prism Assembly, 36, and into the PBS, 30. The light reaching the Cartesian PBS Film, 32, from this color pixel element is then at least partially horizontally polarized, and therefore partially substantially transmitted by the Cartesian PBS Film, 32, into the projection lens, and subsequently imaged onto the screen (not shown).

The degree of horizontal polarization imparted to the light reflected from each color pixel element will depend on the level of brightness desired from the particular color pixel at the time. The closer the rotation of the polarization approaches a pure horizontal polarization state at any given time, the higher the resulting screen brightness for that particular color pixel element at that particular time.

The present work details specific types of color prism, 36, to be used, as well as color prism, 36, orientation to achieve desirable results. It is highly desirable that the color prism, 36, be capable of orientation with its tilt axes either parallel to that of the PBS, 30, or perpendicular to it, as the designer desires. This allows the system designer to have maximum flexibility with regard to industrial design, cooling, imager placement and other practical projection system considerations. For example, the decision as to whether to make a tower configuration (where the shortest dimension of the projector is held horizontal in use) or a more conventional flat configuration (where the shortest dimension is held vertical in use) with the most compact possible color prism assembly would not be an option open to the designer in the absence of the aforementioned flexibility. The alternatives open to a designer using the configuration of FIGS. 1a and 1b have in the past been: a) design using the most compact possible color prism to accommodate the selected imager, but place the prism in a "tower" configuration, or b) design a larger color prism capable of accommodating the long, horizontal axis of the imager within the shorter dimension of the color prism face.

In the second case the projector may be oriented in a flat configuration, but it will be larger and heavier than the alternate tower configuration. The former option may be undesirable for commercial and thermal reasons, while the latter is undesirable due to the premium placed on small size and weight in the marketplace. Because a Cartesian PBS prepares a sufficiently pure polarization state at usefully low $f/\#$, the color prism, 36, may be rotated 90° about the optic axis, 62, when the Cartesian PBS is employed. This enables the usage of a smaller color prism, 36, for the horizontal projector layout.

EXAMPLES

A 3M APF type Cartesian polarizer film was used as a polarization splitting surface, which allows the PBS film to be placed in a glass cube, similarly to a MacNeille PBS. An advantage of the APF type PBS is that, unlike the MacNeille PBS, it may be used with glass of any index. This allows flexibility for selecting glasses with different properties that may be desirable for different applications. Examples include low blue light absorption where color gamut and balance is important, or low stress optic coefficient for high light intensity applications, or higher index of refraction for smaller angular spread in the glass, allowing smaller components where compact design is important. Secondly, because tilted color separation coatings such as those used in color prisms are sensitive to angle, a fully telecentric beam was used for these experiments. This beam provides a full $f/2$ cone at all points on the imager, thereby ensuring that all allowable rays of light in an $f/2$ beam are represented at all image locations in our tests. The system has been designed for maximum flexibility, for example to allow easy changes of illumination $f/\#$.

The PBS 30 in FIGS. 1*a* and 1*b* is illuminated with light polarized into and out of the page (vertically), so it is nominally an s-polarized beam with respect to the PBS. The vertical direction will be referred to in the future as the y direction, and the direction of light propagation will be referred to as the z direction. The color prism 36 depicted is a so-called Philips Prism. However, the detailed results are expected to be independent of the precise color prism configuration.

The y-polarized light incident on the PBS from the lamp, 12, is reflected by the PBS into the color prism. The color prism is shown with its reflecting planes for red and blue light rotated about an axis parallel to that about which the PBS is rotated (parallel to the y-axis). The configuration shown will be referred to as an "s-oriented" color prism.

The other case to be considered is that where the color prism is rotated by 90 degrees about the direction of propagation of the central ray of light through the color prism. In this case the inclined color reflecting surfaces are rotated about an axis perpendicular to that of the PBS rotation axis, which will be referred to as a "p-oriented" color prism.

Wide-angle, high-extinction MacNeille PBS and color prism systems are offered for sale, but are generally designed only to work at $f/2.8$ and higher. Experimental results using such a MacNeille PBS at $f/2$ with no color prism and with simulated perfect imagers, yielded only 80:1 contrast. In the present exemplary experimental setup, the simulated perfect imager consisted of a first surface mirror simulating a dark state and a quarter wave film ("QWF") laminated to mirror and rotated so that its optic axis was 45 degrees to the incident polarization simulating the bright state. It therefore seems unlikely that contrast at acceptable levels (exceeding 250:1 for perfect imagers, so that system contrast with actual imagers will be adequate) could be possible once the color prism is inserted.

However, the Cartesian PBS and color prism of the present invention are specifically designed to be used together in a system. The design assumes that the PBS and the color prism are oriented to have their reflective planes rotated about parallel axes. In general, it was found that known previous systems had been designed with the PBS and the color prism having parallel tilt axes for their reflecting surfaces. Such an arrangement appears to have been chosen because the rays that have highest contrast are those propagating within the plane defined by the normal to the reflecting surface and the optical axis (i.e., the reflection plane of the central ray), whether for a PBS or for a color selective surface. Thus, for conventional components with narrow bands of high contrast situated near the reflection plane of the central ray, (the so-called Maltese bands) perpendicular tilt axes result in a very small region of high contrast, defined by the overlap of the high contrast band of the PBS and the perpendicular high contrast band of the color prism. The amount of light contained in this very small region of angle space is inadequate to provide acceptable contrast at usefully small $f/\#$'s, and so this configuration has never been selected by designers using conventional components.

For the Cartesian PBS, it was found that the band of high contrast for rays reflected from the PBS surface is so broad and the inherent contrast is so good that contrast degradation due to crossing of the tilt axes of the PBS and the color prism is very small. Indeed, in some cases, it is not apparent from the data that there is any inherent degradation in contrast, though it was initially expected for such degradation to be easily noticeable. The performance of the components and system will be demonstrated through the examples below.

Example 1

Performance of APF Cartesian PBS with No Color Prism

Figure 3:
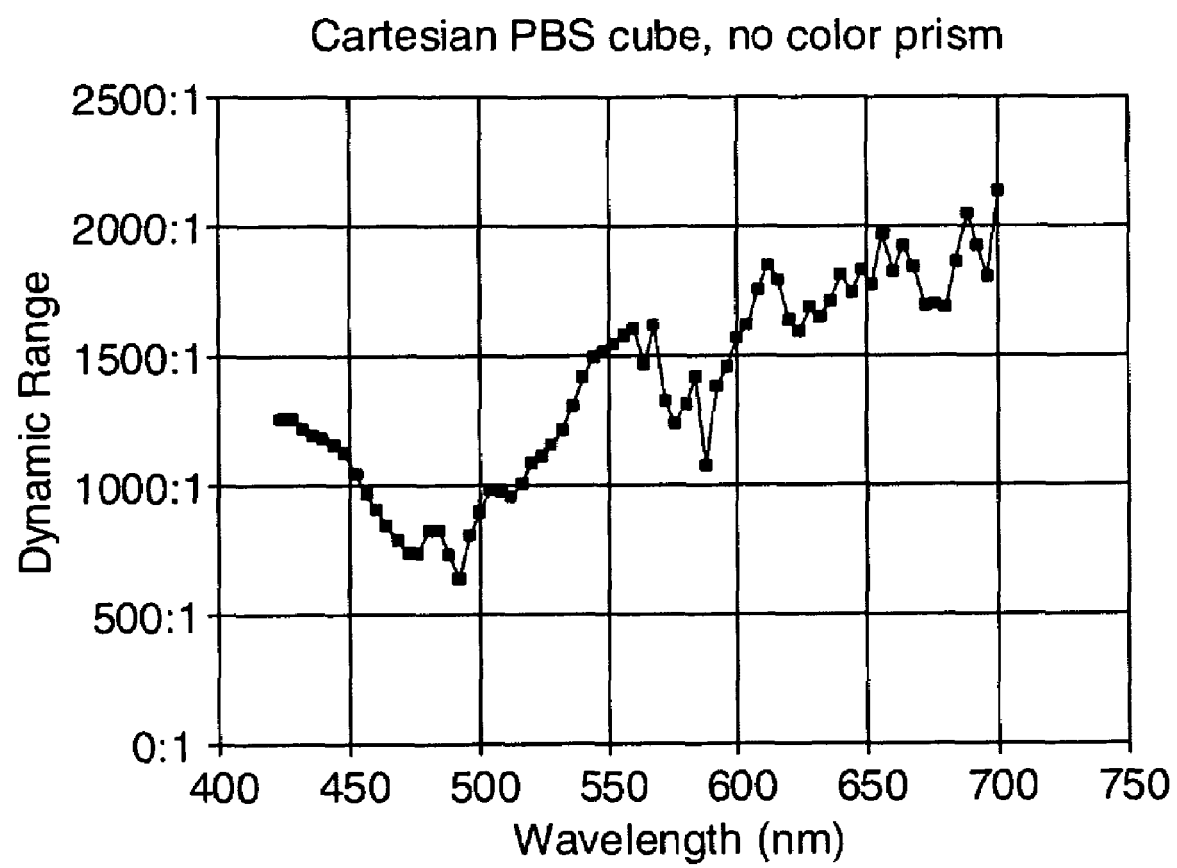
FIG. 3 is a graph of APF Cartesian PBS dynamic range of contrast performance vs. wavelength of light.
Figure 4:
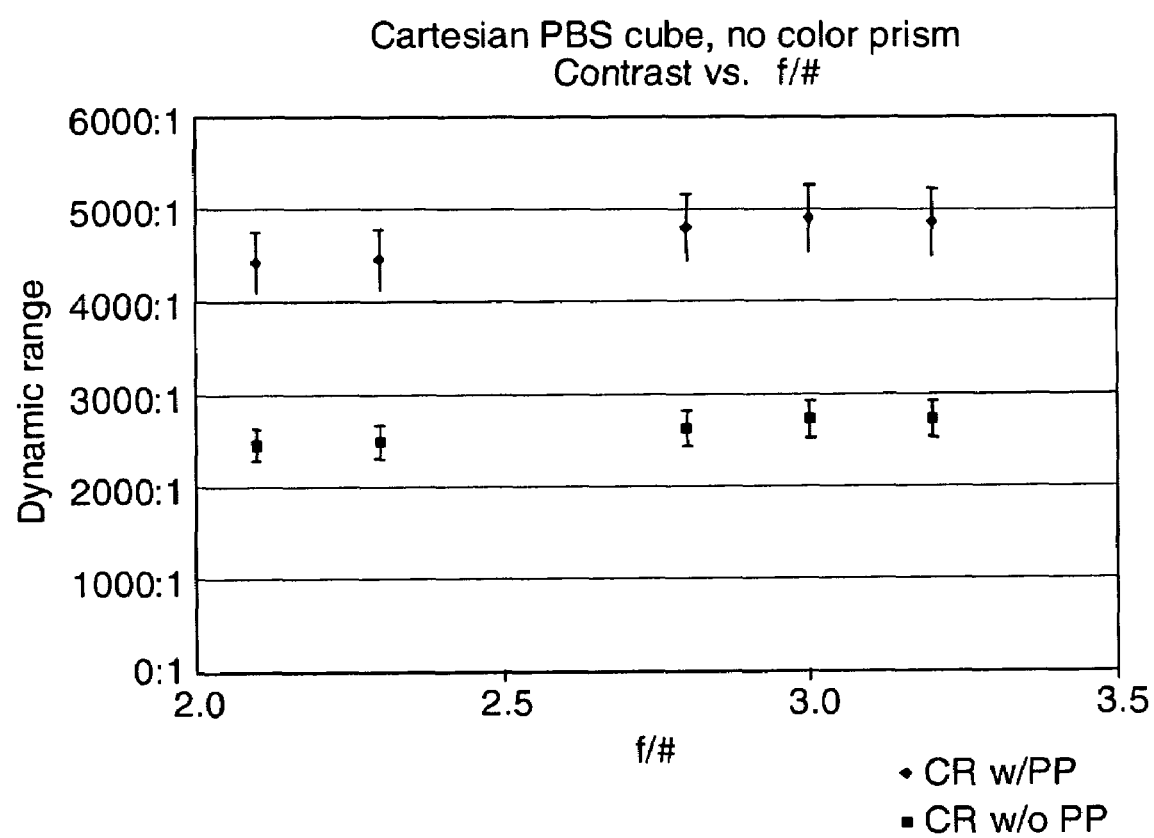
FIG. 4 is a graph of APF Cartesian PBS of contrast performance vs. $f/\#$.

Data was first taken to establish the baseline performance of the APF PBS, the mirror simulation of an imager in its dark state, and the mirror with quarter wave film simulation of an imager in its bright state, along with the overall contrast capability of the system of FIGS. 1*a* and 1*b* (without a color prism). The resulting data is shown in FIGS. 3 and 4 for two different samples of APF Cartesian PBS. The data indicates a very high level of contrast even vis-a-vis the earlier reported performance of plate-type Cartesian PBS systems. FIG. 3 shows the results as a function of wavelength of light at $f/2$, while FIG. 4 indicates results as a function of $f/\#$. In both cases, the PBS film was contained in a cubic prism made of BK7 glass. In FIG. 4, the data was taken both with and without an optional clean-up polarizer just before the projection lens, to remove stray light due to a slight haze in the PBS prism. The optional clean-up polarizer is not present for the data in FIG. 3. These contrast levels indicate that the optical system itself, including the PBS but not the color prism, has a dark state which presents less than 0.1% of the light present in the bright state.

Example 2

Performance of APF Cartesian PBS and Color Prism with Parallel Tilt Axes

If the color prism is added to the system, but the imagers continue to be simulated by mirrors and quarter wave films as before, then the effects of the depolarization cascade may be assessed. To evaluate these effects, the color prism was designed to work optimally with light that is perfectly y-polarized. The color prism was designed for use at $f/\#$'s down to 2.8, with the PBS and the color prism having parallel tilt axes. Versions of the color prism made of BK7 and of SK5 glass have been used in this work, but the present example focuses on the BK7 glass prism, which has an index of refraction matching that used in the design work. It is important to note, that the color prism was designed to work with perfectly y-polarized light, such as that presented by a Cartesian polarizer. It was specifically not designed to compensate the polarization impurities introduced by a MacNeille PBS. (Designing the color prism to ameliorate the angle dependent phase and rotation of the polarization state of the light introduced by the MacNeille polarizer will degrade the performance of a system using a Cartesian PBS. Similarly, a color separation and recombination prism designed to work well with a Cartesian PBS will perform poorly with a MacNeille PBS.) Accordingly, the use of a Cartesian PBS simplifies color prism design by removing the necessity for such compensation.

Figure 5A:
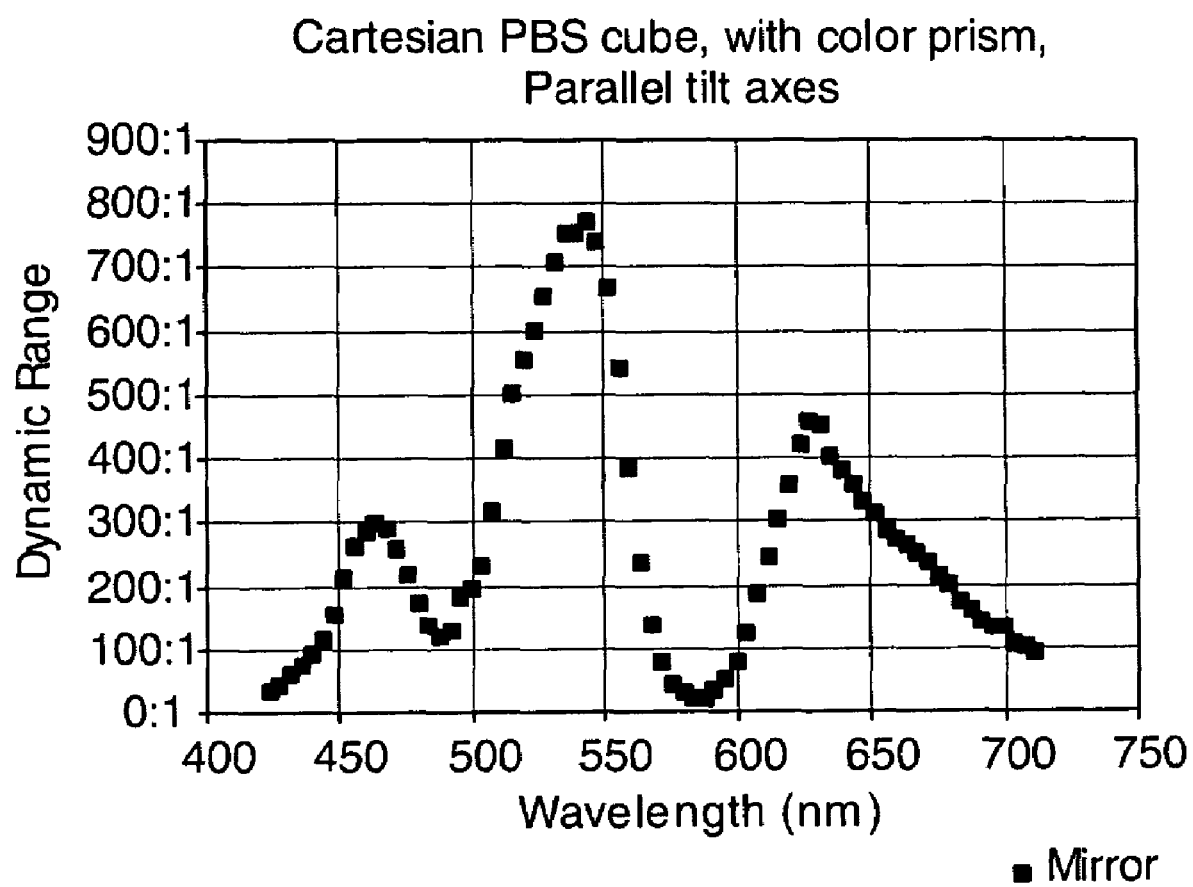
FIGS. 5*a* and 5*b* are graphs of the contrast and dark and bright state spectral radiance vs. wavelength for PBS and color prism with parallel tilt axes.
Figure 5B:
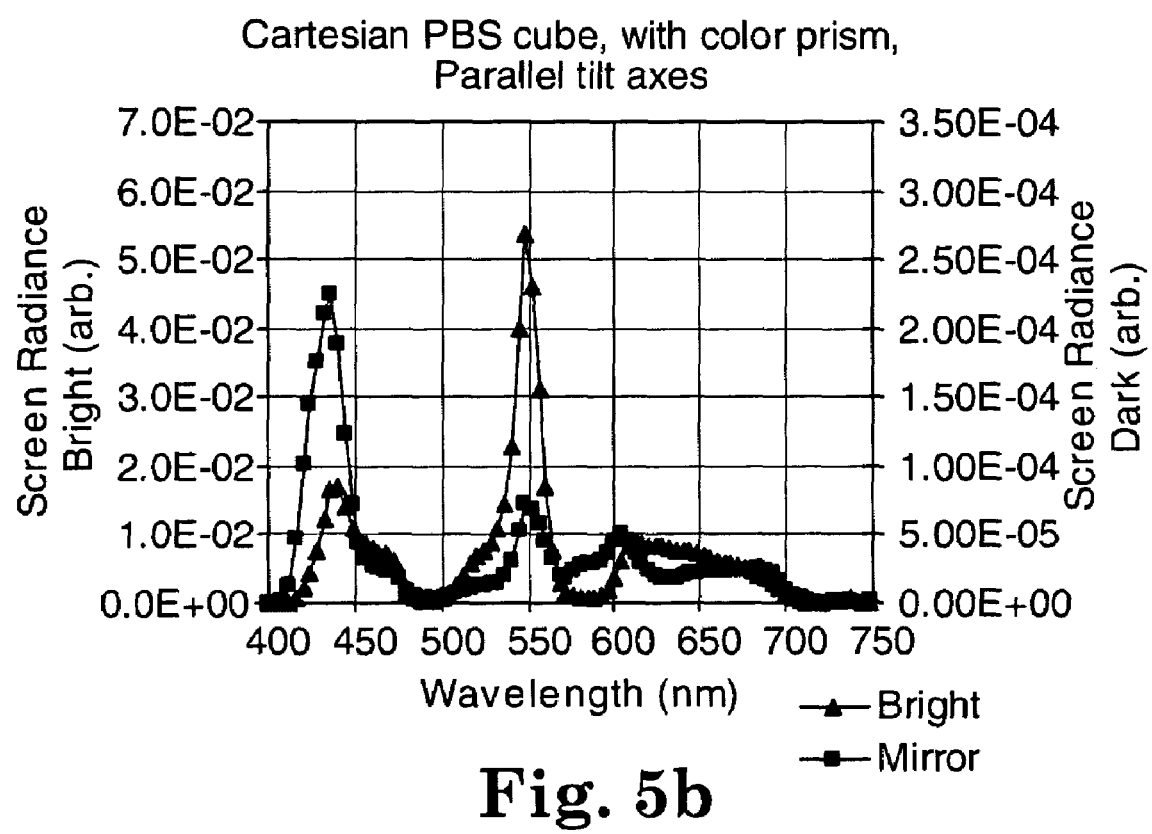

FIG. 5a shows the results of placing the color prism and APF PBS in the system of FIGS. 1a and 1b with parallel tilt axes. In taking data for this figure a "notch filter" has been used to block light from the low contrast yellow and cyan regions. (The spectral regions have low contrast due to the effects of band edges in the color separating coatings on the phase of light near the band edges). FIG. 5b shows the dark and light state irradiance in the same arbitrary units. The photopic contrast ratio is 389:1.

Figure 6:
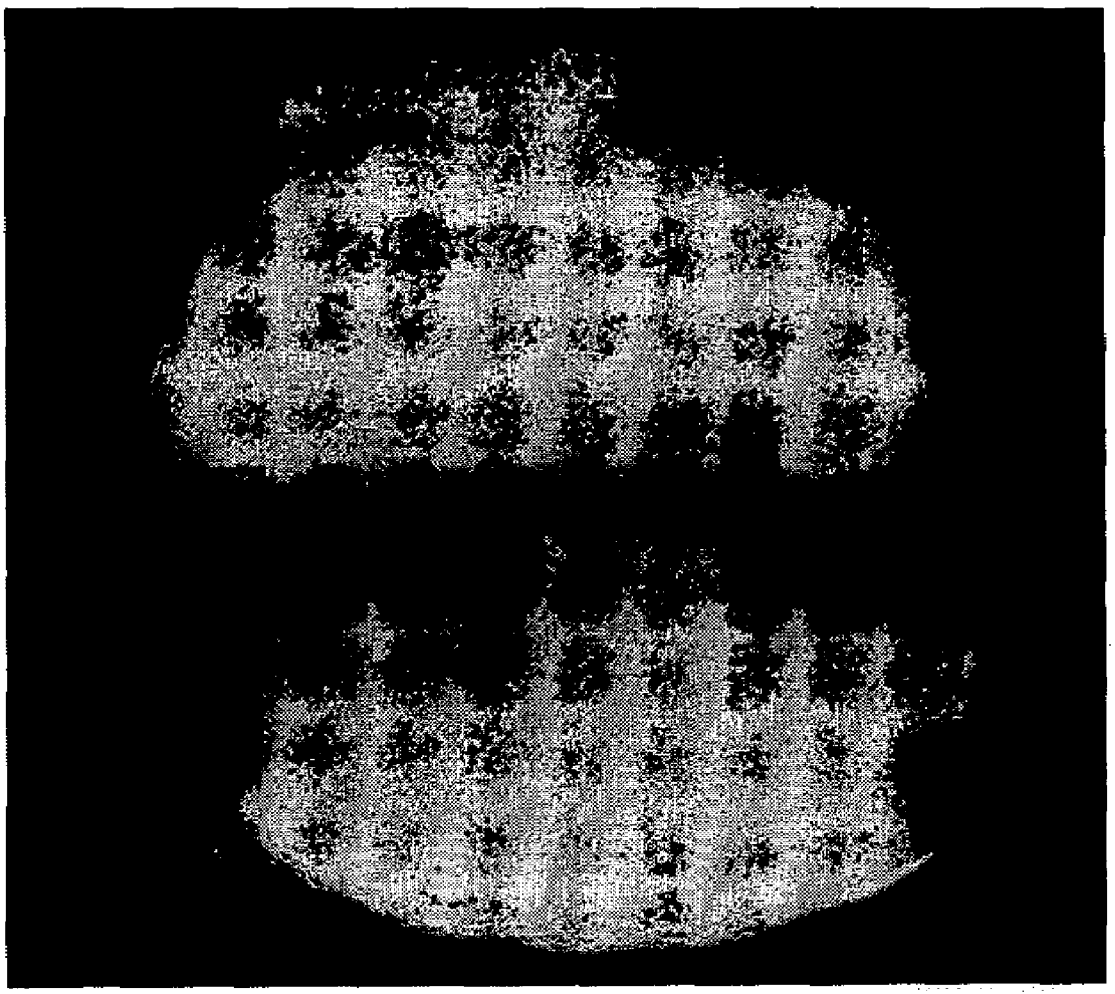
FIG. 6 is a pupil image of dark state Maltese band for a parallel, s-oriented PBS and color prism.
Figure 7:
FIG. 7 is a pupil image of a dark state Maltese band for APF PBS without color prism.

FIG. 6 shows the Maltese band of the dark state for the system configuration of FIGS. 5a and 5b, and FIG. 7 shows (for comparison) the same Maltese band for the APF with no color prism. For parallel tilt axes, the Maltese band of the color prism overlays and is parallel to that of the PBS. This reduces the width of the resulting Maltese band, resulting in a decrease in the contrast ratio between the configuration used in FIGS. 3 and 4 without a color prism, and that used for FIGS. 5a and 5b with a color prism.

The degradation of contrast outside the relatively narrow region around the reflection plane of the central ray may be attributed to the color prism. This is evident from FIG. 7, which shows the equivalent pupil image when the color prism is removed. The digital camera used for these images automatically re-scales the brightness of the image, so direct comparisons between the two figures is not possible. However, the contrast ratio for the configuration of FIG. 7 is about six times that for FIG. 6, meaning that this dark state pupil image is six times darker than FIG. 6.

Example 3

Performance of APF Cartesian PBS and Color Prism with Perpendicular Tilt Axes

Because the Maltese band for the PBS itself is so deep and broad, we expect that there may be a minimal degradation in contrast resulting from the crossing of the Maltese band due to the color prism with that due to the PBS. In this case, rather than figuratively overlaying the narrow horizontal Maltese band of the color prism over the broad horizontal Maltese band of the PBS, a vertical Maltese band is overlayed due to the color prism cross-wise over the broad horizontal Maltese band of the PBS. Due to the extremely broad nature of the Maltese band of the APF PBS (the pupil image contains rays with polar angles out to about 14°) the degradation in contrast resulting from this crossing of bands is small. This is quite different from the case for conventional MacNeille PBS components.

Figure 8A:
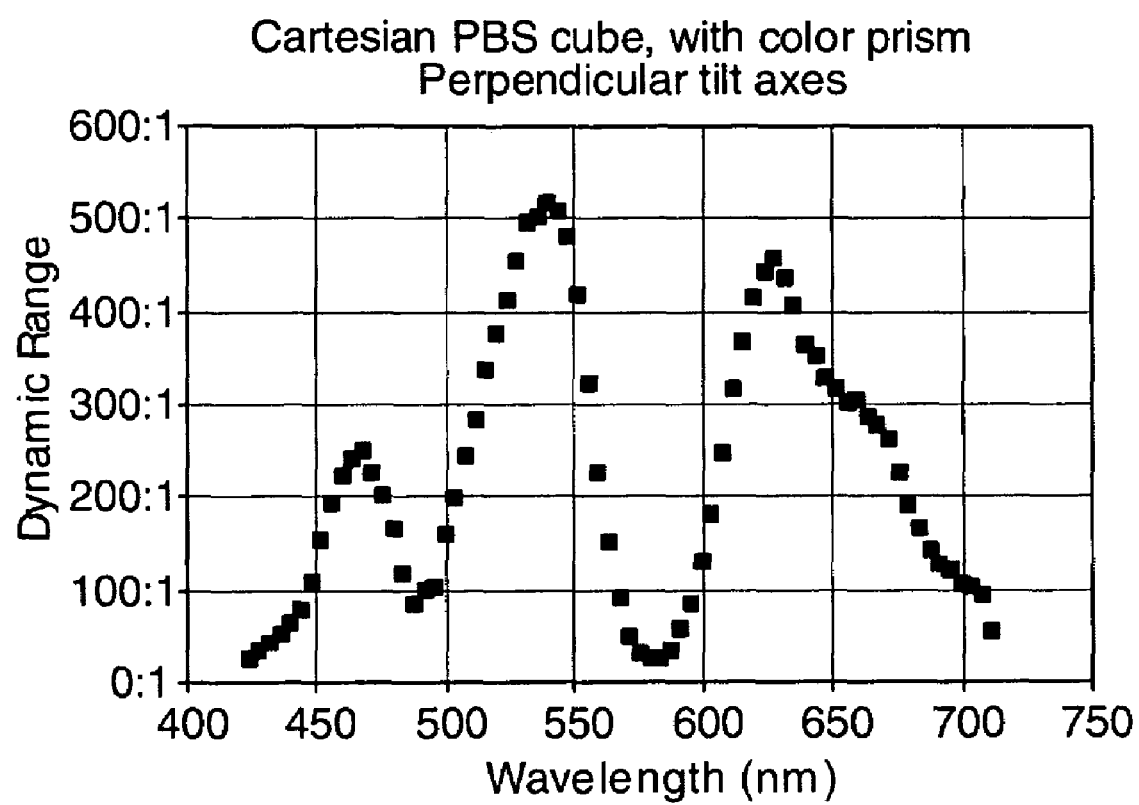
FIG. 8*a* is a graph of contrast vs. wavelength for PBS and color prism with crossed tilt axes.
Figure 8B:
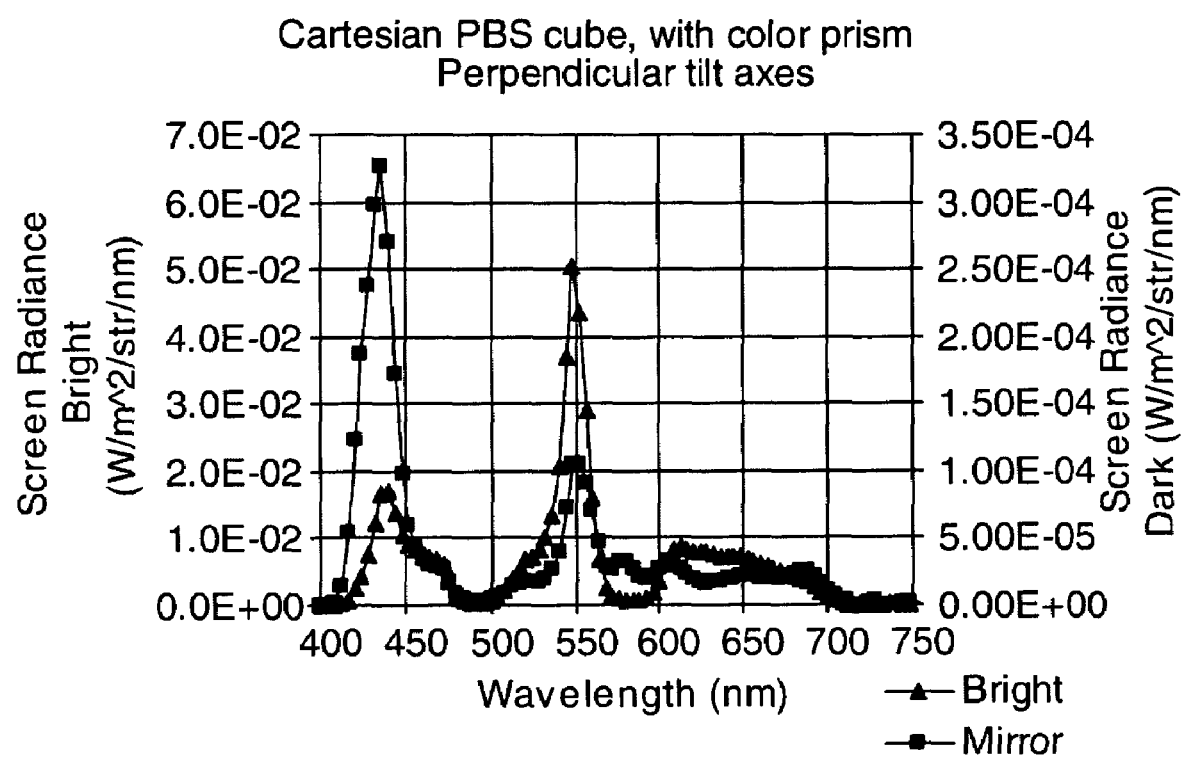
FIG. 8*b* is a graph of dark and bright state spectral radiance for PBS and color prism with crossed tilt axes.

FIG. 8a demonstrates the performance obtained when the color prism is rotated so that s-polarized light from the PBS became p-polarized relative to the inclined surfaces of the color prism. It is clear that the contrast is somewhat lower than in FIG. 5a, but the reduction is quite small, only about 15% (301:1 vs. 360:1). In addition, because a high pressure Hg lamp was used, and because these lamps present a non-uniform, peaked spectral intensity function (as can be seen in FIGS. 5b and 8b) the photopic contrast is quite sensitive to the precise wavelengths at which the color prism coatings provide the best contrast.

Figure 9:
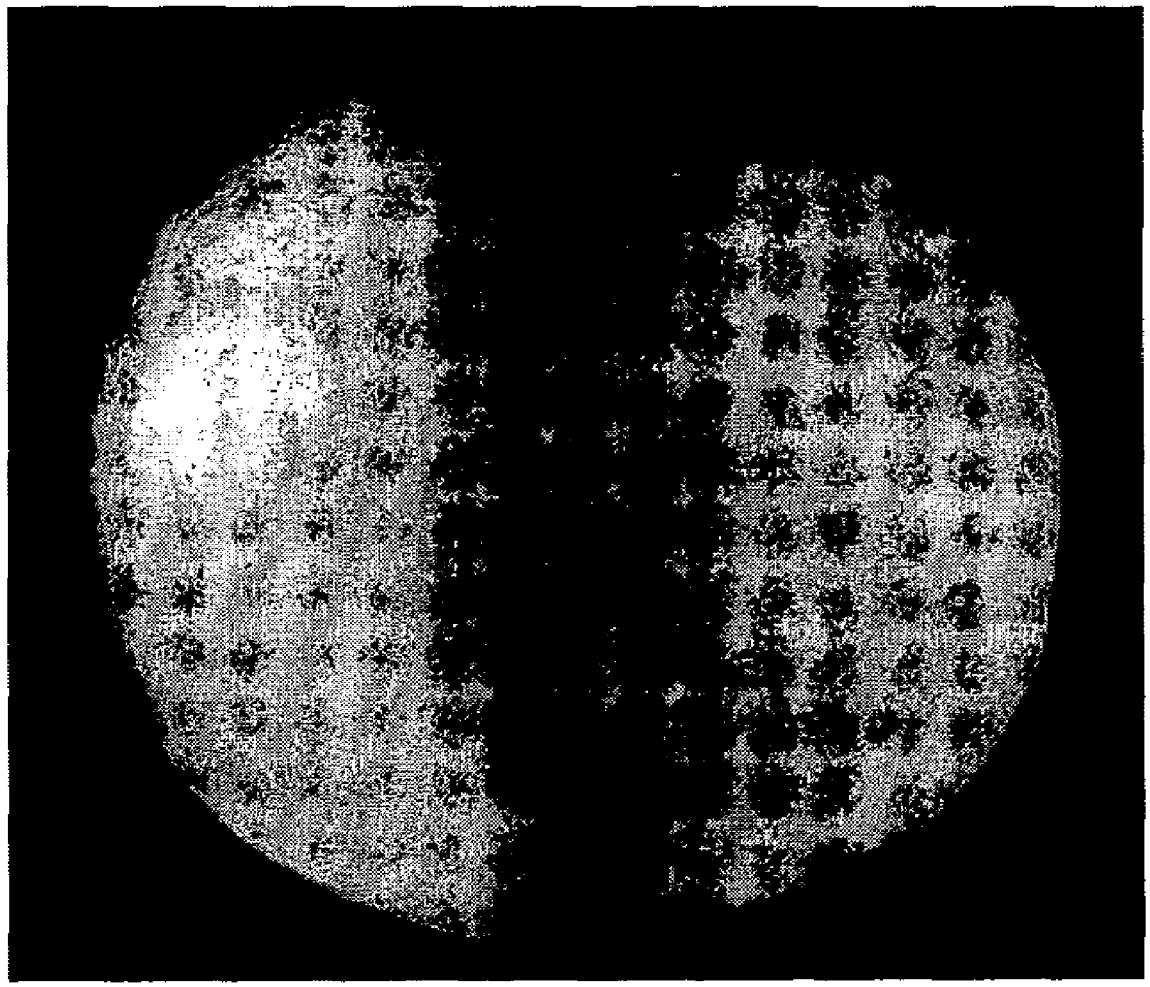
FIG. 9 is a dark state pupil image of Maltese band for perpendicular tilt axes.

The peaked nature of the spectral intensity function of the lamp makes final system performance very sensitive to small variations in the spectral contrast performance of the color prism. It is therefore essential to refine the color prism design to ensure that peak spectral contrast wavelength remains at the spectral peaks of lamp intensity after rotating the prism tilt axes so that they are not parallel to that of the PBS. FIG. 9 depicts the Maltese band for the perpendicular tilt axes configuration. In keeping with the minimal contrast ratio differences seen between FIGS. 5a and 8a, this image looks much like that of FIG. 6, rotated by 90°.

The invention claimed is:

1. A projection system comprising:
   a) a Cartesian polarizing beam splitter, the Cartesian polarizing beam splitter defining a first tilt axis perpendicular to a first reflection plane;
   b) a color separation prism assembly, the prism assembly having a second tilt axis perpendicular to a second reflection plane;
   c) wherein the Cartesian polarizing beam splitter and the prism assembly are arranged such that the first and the second reflection planes are perpendicular to each other.

2. The projection system of claim 1, further comprising an illumination system providing a beam of light, the illumination system having an f/# less than or equal to 2.5.

3. The projection system of claim 1, wherein the projection system is a front projection system.

4. The projection system of claim 1, wherein the system is a rear projection system.

5. The projection system of claim 1, wherein the color separation prism assembly includes a Philips prism.

6. The projection system of claim 1, wherein the Cartesian polarizing beam splitter includes a multilayer optical film.

7. The projection system of claim 1, wherein the Cartesian polarizing beamsplitter is disposed so that illumination light reaching the color separation prism assembly via the Cartesian polarizing beamsplitter is in substantially the same polarization state across all color bands.

8. A projection system comprising:
   (a) a polarizing beam splitter, the polarizing beam splitter defining a first tilt axis perpendicular to a first reflection plane; and
   (b) a color prism assembly, the color prism assembly having a second tilt axis perpendicular to a second reflection plane, the polarizing beam splitter and the prism assembly being arranged so that the first reflection plane is perpendicular to the second reflection plane.

9. The system as recited in claim 8, wherein the polarizing bean splitter comprises a Cartesian polarizing beam splitter.

10. The system as recited in claim 8, further comprising an illumination system capable of providing a beam of light incident at the polarizing beamsplitter, the illumination system having an f-number less than or equal to 2.5.

11. The system of claim 8, wherein the projection system is a front projection system.

12. The system of claim 8, wherein the system is a rear projection system.

13. The system of claim 8, wherein the prism assembly comprises a Philips prism.

14. The system of claim 8, wherein the polarizing beam splitter comprises a multilayer optical film disposed between two prisms.

15. The system claim 8, further comprising a plurality of imagers, the color prism assembly having a plurality of transmissive surfaces and each imager of the plurality of imagers being aligned with respect to a corresponding transmissive surface of the prism assembly.

16. The system of claim 8, wherein the first tilt axis is perpendicular to the first reflection plane defined by a light ray incident at the polarizing beam splitter and a normal to a reflecting surface of the polarizing beamsplitter and the second tilt axis is perpendicular to the second reflection plane defined by a light ray incident at the color prism assembly and a normal to a reflection surface of the color prism assembly.

* * * * *

UNITED STATES PATENT AND TRADEMARK OFFICE
CERTIFICATE OF CORRECTION

PATENT NO. : 7,652,820 B2  Page 1 of 1
APPLICATION NO. : 11/315721
DATED : January 26, 2010
INVENTOR(S) : David John Williams Aastuen It is certified that error appears in the above-identified patent and that said Letters Patent is hereby corrected as shown below:

On the Title Page:

The first or sole Notice should read --

Subject to any disclaimers, the term of this patent is extended or adjusted under 35 U.S.C. 154(b) by 357 days.

Column 2
Line 48 (approx.), delete "MacNellie" and insert -- MacNeille --, therefor.
Line 62, delete "pat" and insert -- path --, therefor.
Line 64, delete "my." and insert -- ray. --, therefor.
Line 65, delete "MacNellie" and insert -- MacNeille --, therefor.

Column 3
Line 10 (approx.), delete "pat" and insert -- path --, therefor.
Line 13 (approx.), delete "die" and insert -- the --, therefor.
Line 22, delete "MacNellie" and insert -- MacNeille --, therefor.
Line 26 (approx.), delete "I." and insert -- J. --, therefor.

Column 6
Line 43, delete "2g" and insert -- 2a --, therefor.

Column 7
Line 62, delete "MacNeill" and insert -- MacNeille --, therefor.

Column 12
Line 63, in Claim 9, delete "bean" and insert -- beam --, therefor.

Column 13
Line 11, in Claim 15, after "system" insert -- of --.

Signed and Sealed this

Twenty-eighth Day of September, 2010

David J. Kappos
*Director of the United States Patent and Trademark Office*

UNITED STATES PATENT AND TRADEMARK OFFICE
CERTIFICATE OF CORRECTION

PATENT NO.       : 7,652,820 B2                                    Page 1 of 1
APPLICATION NO. : 11/315721
DATED            : January 26, 2010
INVENTOR(S)      : Aastuen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 337 days.

Signed and Sealed this

Twenty-third Day of November, 2010

David J. Kappos
*Director of the United States Patent and Trademark Office*